(12) United States Patent
Iorio (10) Patent No.: US 10,489,533 B2
(45) Date of Patent: Nov. 26, 2019

(54) TECHNIQUES FOR WARM STARTING FINITE ELEMENT ANALYSES WITH DEEP NEURAL NETWORKS

(71) Applicant: Autodesk, Inc., San Rafael, CA (US)

(72) Inventor: Francesco Iorio, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 368 days.

(21) Appl. No.: 15/158,491

(22) Filed: May 18, 2016

(65) Prior Publication Data

US 2017/0032068 A1 Feb. 2, 2017

Related U.S. Application Data

(60) Provisional application No. 62/199,942, filed on Jul. 31, 2015.

(51) Int. Cl.
| | |
|---|---|
| *G06F 7/60* | (2006.01) |
| *G06F 17/10* | (2006.01) |
| *G06F 17/50* | (2006.01) |
| *G06N 3/08* | (2006.01) |
| *G06N 20/00* | (2019.01) |

(52) U.S. Cl.
CPC .......... *G06F 17/5018* (2013.01); *G06N 3/08* (2013.01); *G06N 20/00* (2019.01); *G06F 2217/16* (2013.01)

(58) Field of Classification Search
CPC .................................................. G06F 17/5018
USPC ............................................................ 703/2
See application file for complete search history.

(56) References Cited

U.S. PATENT DOCUMENTS

| | | | |
|---|---|---|---|
| 6,208,982 B1 * | 3/2001 | Allen, Jr. ................ | G06F 17/50 706/11 |
| 2013/0096900 A1 * | 4/2013 | Usadi .................. | G06F 17/5018 703/10 |

* cited by examiner

*Primary Examiner* — Timothy A Mudrick
(74) *Attorney, Agent, or Firm* — Artegis Law Group, LLP (57) ABSTRACT

A simulation application receives simulation parameters associated with a simulation to be generated. The simulation parameters include geometry associated with the simulation and corresponding boundary conditions. The simulation engine processes the simulation parameters and then, using a neural network, generates a solution estimate. Based on the estimated solution, the simulation engine then executes a finite element analysis solver using the solution estimate as a starting point. The FEA solver iterates until a converged solution is reached. The converged solution is then provided to the end-user.

20 Claims, 4 Drawing Sheets

TECHNIQUES FOR WARM STARTING FINITE ELEMENT ANALYSES WITH DEEP NEURAL NETWORKS

CROSS-REFERENCE TO RELATED APPLICATIONS

This application claims the benefit of U.S. provisional patent application titled, "Techniques for Warm-Starting Finite Element Analysis with Deep Neural Networks," filed on Jul. 31, 2015 and having Ser. No. 62/199,942. The subject matter of this related application is hereby incorporated herein by reference.

BACKGROUND OF THE INVENTION

Field of the Invention

Embodiments of the present invention relate generally to computer simulations and, more specifically, to techniques for warm starting finite element analyses with deep neural networks.

Description of the Related Art

Finite element analysis (FEA) is a tool that can be used to simulate a variety of different physical processes. For example, FEA may be applied to simulate heat transfer through a structure. Typically, an FEA simulation includes a mesh of distinct nodes that are coupled together and a system of governing equations that describe how the distinct nodes interact with one another. In the above heat transfer example, the structure could be represented as a triangular mesh of distinct nodes, and heat transfer equations would describe how heat is exchanged between adjacent nodes within the triangular mesh.

A conventional FEA simulation typically executes an FEA solver to iteratively solve the governing equations of the simulation until a set of values is determined that does not "violate" those equations, within a reasonable error tolerance. The FEA solver is said to converge when an appropriate set of values is reached. One drawback to conventional FEA simulations, however, is that, with highly complex geometries, FEA solvers may take a long time to converge. Long wait times can be problematic because oftentimes many different designs need to be simulated before a particular design can be selected. In addition, FEA solvers often execute on shared computing resources that are both costly to use and time-restricted, which can add substantial cost and lead time to engineering projects.

As the foregoing illustrates, what is needed in the art is a more effective approach to increasing the convergence rates of FEA solvers.

SUMMARY OF THE INVENTION

Various embodiments of the present invention set forth a computer-implemented method for generating a finite element analysis (FEA) simulation, including generating a solution estimate based on a set of simulation parameters that describe physical properties of a simulation, where the solution estimate comprises an approximate solution for the simulation, warm-starting a finite element analysis (FEA) solver based on the solution estimate, and starting from the solution estimate, causing the FEA solver to iteratively solve a set of governing equations associated with the simulation to generate a converged solution for the simulation.

At least one advantage of the disclosed approach is that the FEA solver converges much faster when provided with a solution estimate than when starting with no estimate

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

In the following description, numerous specific details are set forth to provide a more thorough understanding of the present invention. However, it will be apparent to one of skill in the art that the present invention may be practiced without one or more of these specific details.

Figure 1:
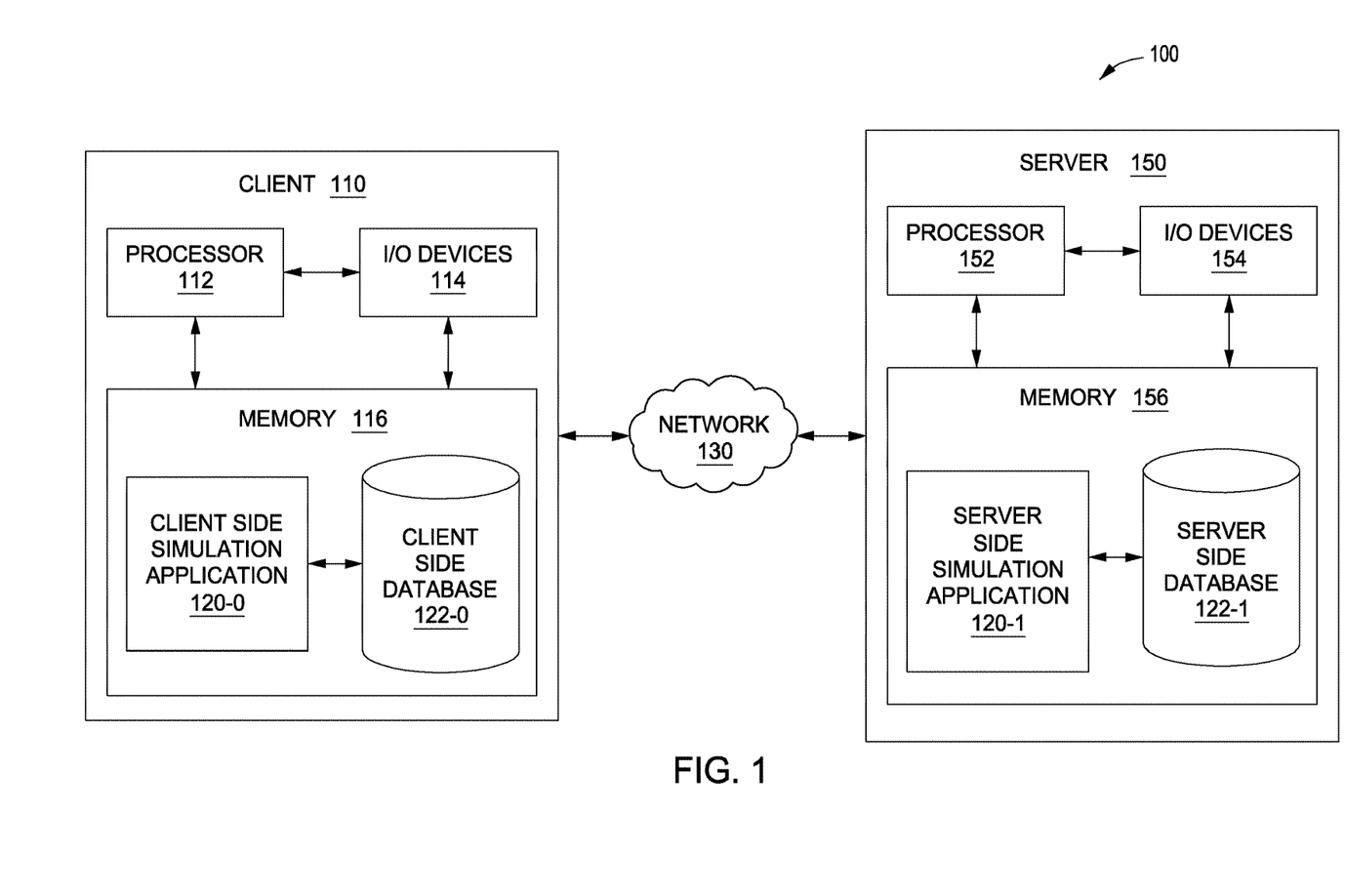
FIG. 1 illustrates a system configured to implement one or more aspects of the present invention.

FIG. 1 illustrates a system 100 configured to implement one or more aspects of the present invention. As shown, system 100 includes a client 110 coupled via a network 130 to a server 150. Client 110 may be any technically feasible variety of client computing device, including a desktop computer, laptop computer, mobile device, and so forth. Network 150 may be any technically feasible set of interconnected communication links, including a local area network (LAN), wide area network (WAN), the World Wide Web, or the Internet, among others. Server 150 may be any technically feasible type of server computing device, including a remote virtualized instance of a computing device, one or more physical cloud-based computing devices, a combination of the two, a portion of a datacenter, and so forth.

Client 110 includes processor 112, input/output (I/O) devices 114, and memory 116, coupled together. Processor 112 may be any technically feasible form of processing device configured process data and execute program code. Processor 112 could be, for example, a central processing unit (CPU), a graphics processing unit (GPU), an application-specific integrated circuit (ASIC), a field-programmable gate array (FPGA), and so forth. I/O devices 114 may include devices configured to receive input, including, for example, a keyboard, a mouse, and so forth. I/O devices 114 may also include devices configured to provide output, including, for example, a display device, a speaker, and so forth. I/O devices 114 may further include devices configured to both receive and provide input and output, respectively, including, for example, a touchscreen, a universal serial bus (USB) port, and so forth.

Memory 116 may be any technically feasible storage medium configured to store data and software applications. Memory 116 could be, for example, a hard disk, a random access memory (RAM) module, a read-only memory (ROM), and so forth. Memory 116 includes client-side simulation application 120-0 and client-side database 122-0. Client-side simulation application 120-0 is a software application that, when executed by processor 112, causes processor 112 to generate a simulation of a physical process. In doing so, client-side simulation application 120-0 may access client-side database 122-0. Client-side simulation application 122-0 may also interoperate with a corresponding simulation application that resides within server 150 and access a database that also resides on server 150, as described in greater detail below.

Server 150 includes processor 152, I/O devices 154, and memory 156, coupled together. Processor 152 may be any technically feasible form of processing device configured to process data and execute program code, including a CPU, a GPU, an ASIC, an FPGA, and so forth. I/O devices 114 may include devices configured to receive input, devices configured to provide output, and devices configured to both receive and provide input and output, respectively.

Memory 156 may be any technically feasible storage medium configured to store data and software applications, including a hard disk, a RAM module, a ROM, and so forth. Memory 156 includes server-side simulation application 120-1 and server-side database 122-1. Server-side simulation application 120-1 is a software application that, when executed by processor 156, causes processor 152 to generate a simulation of a physical process. In doing so, server-side simulation application 120-1 may access server-side database 122-1. Server-side simulation application 122-1 may also interoperate with client-side simulation application 120-0 and access client-side database 122-0.

In operation, client-side simulation application 120-0 and server-side simulation application 120-1 cooperate to implement any and all of the inventive functionality described herein. In doing so, either one or both of client-side simulation application 120-0 and server-side simulation application 120-1 may access either one or both of client-side database 122-0 and server-side database 122-1. Generally, client-side simulation application 120-0 and server-side simulation application 120-1 represent different portions of single distributed software entity. Thus, for simplicity, client-side simulation application 122-0 and server-side simulation application 122-1 will be collectively referred to herein as simulation application 120. Similarly, client-side database 122-0 and server-side database 122-1 represent different portions of a single distributed storage entity. Therefore, for simplicity, client-side database 122-0 and server-side database 122-1 will be collectively referred to herein as database 122.

As described in greater detail below in conjunction with FIG. 2, simulation application 120 is configured to receive from an end-user simulation parameters associated with a simulation to be generated. The simulation parameters include geometry associated with the simulation and corresponding boundary conditions. The simulation could be a fluid dynamics simulation, a thermal simulation, a material simulation, an electromagnetic simulation, and so forth. Simulation engine 120 processes the simulation parameters and then, using a neural network, generates a solution estimate. The solution estimate could reflect an estimated velocity vector field in the case of a fluid dynamics simulation, an estimated temperature distribution in the case of a thermal simulation, an estimated stress/strain distribution in the case of a materials simulation, or an estimated electromagnetic field in the case of an electromagnetic simulation. Based on the estimated solution, simulation engine 120 then executes an FEA solver using the solution estimate as a starting point. The FEA solver iteratively solves a set of governing equations associated with the simulation until a converged solution is reached. The converged solution is then provided to the end-user.

An advantage of this approach is that the FEA solver converges much faster when provided with a solution estimate compared to starting with no estimate. In addition, because the neural network within simulation application 120 analyzes problem-specific geometry and boundary conditions, the solution estimate reflects predicted effects of those problem-specific aspects of the simulation. This approach represents a significant improvement over conventional warm starting techniques that only implement numerical optimizations.

Figure 2:
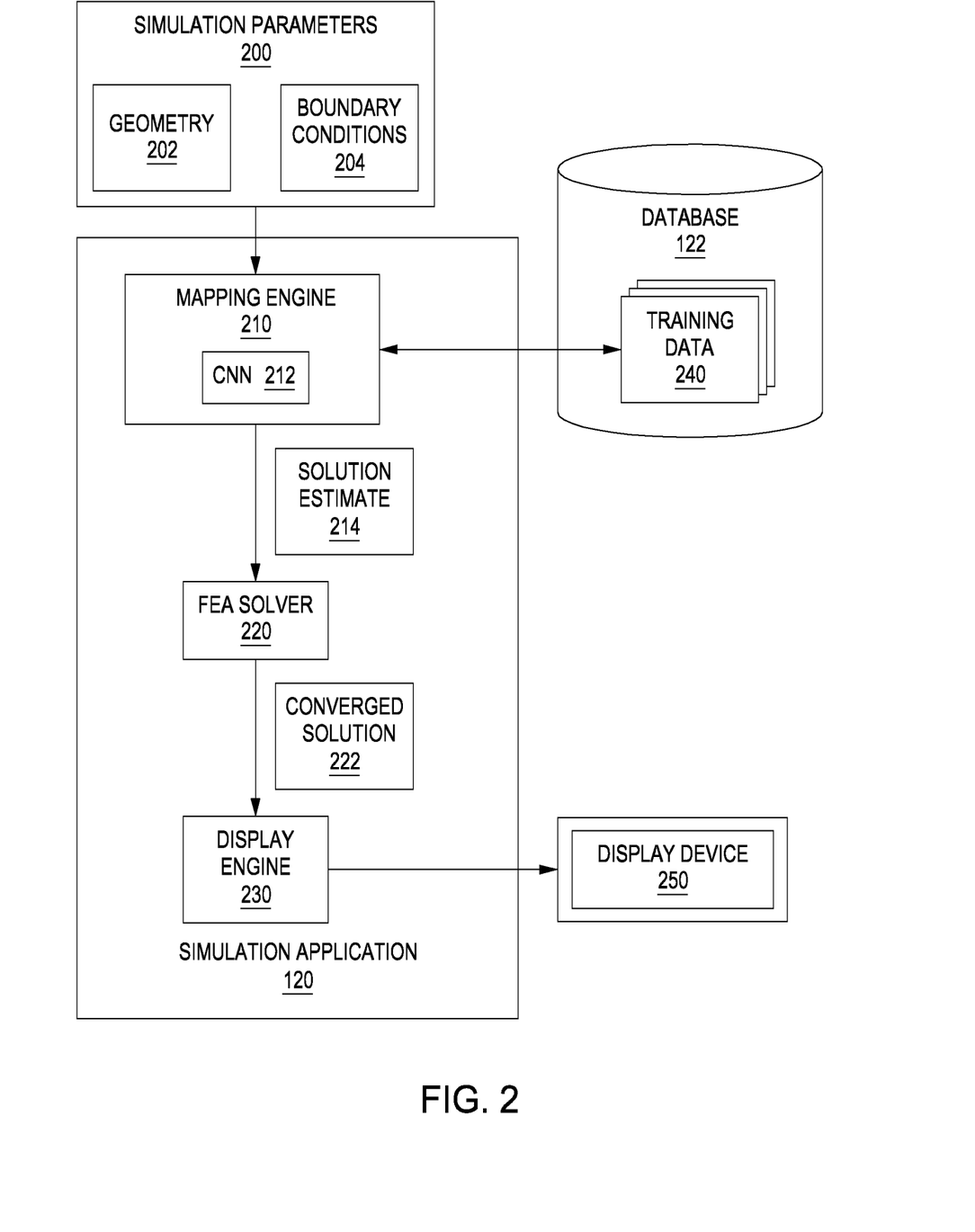
FIG. 2 is a more detailed illustration of the simulation application of FIG. 1, according to various embodiments of the present invention.

FIG. 2 is a more detailed illustration of the simulation application of FIG. 1, according to various embodiments of the present invention. As shown, simulation application 120 includes a mapping engine 210, an FEA solver 220, and a display engine 230. Database 122 includes training data 240.

In operation, mapping engine 210 receives simulation parameters 200 from an end-user. Simulation parameters 200 include geometry 202 and boundary conditions 204. Geometry 202 represents a structure or combination of structures within which one or more physical processes may occur. For example, geometry 202 could represent a beam having a specific cross-section and configured to support a certain load. Geometry 202 may represent a structure (such as a beam) as a triangulated mesh, a grid of cells, or another type of discretized, finite element representation. Boundary conditions 204 represent constraints applied to geometry 202. In the above beam example, boundary conditions 204 could indicate that one end of the beam is clamped. Persons skilled in the art will understand that geometry 202 may represent a wide variety of different types of structures, depending on the nature of the simulation to be generated. Likewise, those skilled in the art will recognize that boundary conditions 204 may include many different kinds of conditions, depending, again, on the nature of the simulation.

Upon receipt of simulation parameters 200, mapping engine 210 implements a convolutional neural network (CNN) 212 to map simulation parameters 200 to a solution estimate 214. Solution estimate 214 includes a set of values that represent an approximate solution for the simulation. As mentioned above, solution estimate 214 may include different values depending on the type of simulation to be generated. For example, suppose the geometry associated with a thermal simulation of a gas-turbine engine blade includes a triangulated mesh representing the blade. In this case, solution estimate 214 would include a temperature estimate for each node of the triangulated mesh.

CNN 212 within mapping engine 210 may have any technically feasible network architecture, including any of those commonly associated with deep neural networks. For example, CNN 212 could have a plurality of different sets of layers, where each different set of layers corresponds to a different X, Y, or Z dimension. CNN 212 could be trained using any technically feasible training approach. For example, CNN 212 could be provided with training data 240 that includes a large dataset of simulation parameters for different sample simulations, as well as converged solutions for those simulations. The converged solutions could be generated via an FEA solver. During training, CNN 212 would adjust weights within each different layer in order to associate specific geometrical features and/or boundary conditions of the sample simulations with certain portions of the corresponding converged solutions. Then, when presented with new simulation parameters (such as simulation parameters 200), CNN 212 could generate an approximation to a converged solution (such as solution estimate 214).

Once mapping engine 210 generates solution estimate 214, FEA solver 220 generates the simulation using simulation parameters 200 and solution estimate 214. FEA solver 220 may implement any technically feasible finite-element approach for constructing the simulation. For example, in a fluid dynamics simulation, FEA solver 220 could process a mesh of cells associated with geometry 202, where each cell obeys certain physical laws. Additionally, FEA solver 220 initializes the simulation based on solution estimate 214. In the above example, FEA solver 220 could assign an initial mass flow rate to each mesh cell. FEA solver 220 then iteratively solves the governing equations associated with the simulation until convergence, thereby generating converged solution 222. Converged solution 222 includes a set of values that obey the physical laws associated with the governing equations within a certain tolerance or error level. Persons skilled in the art will understand what is meant by "convergence" in the context of FEA solvers.

Because FEA solver 220 begins iterating from an initial state that reflects predicted effects of the specific geometry and boundary conditions associated with the simulation, FEA solver 220 may converge much faster than a conventional FEA solver. Further, FEA solver 220 may also outperform conventional warm starting techniques that rely on numerical optimizations such a condition number reduction, because these numerical optimizations do not address geometrical aspects of the simulation.

Figure 3:
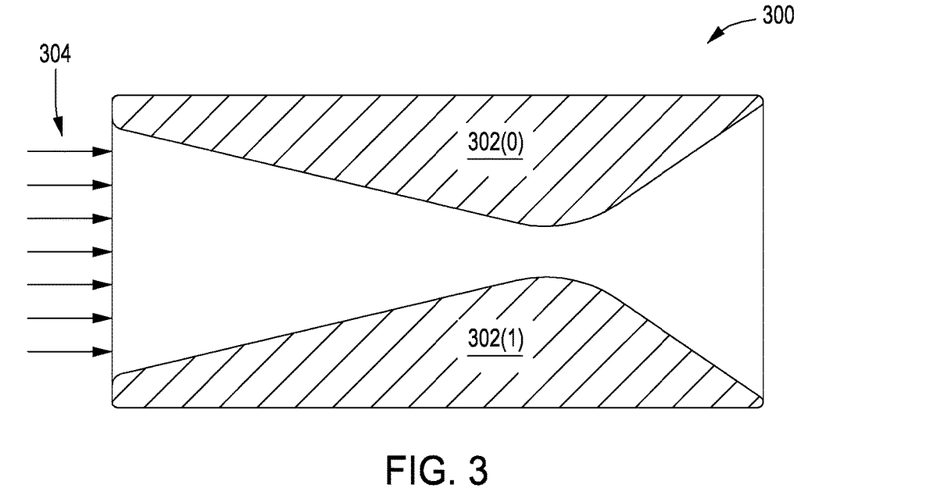
FIG. 3 is an exemplary illustration of geometry and boundary conditions associated with a simulation, according to various embodiments of the present invention.
Figure 4:
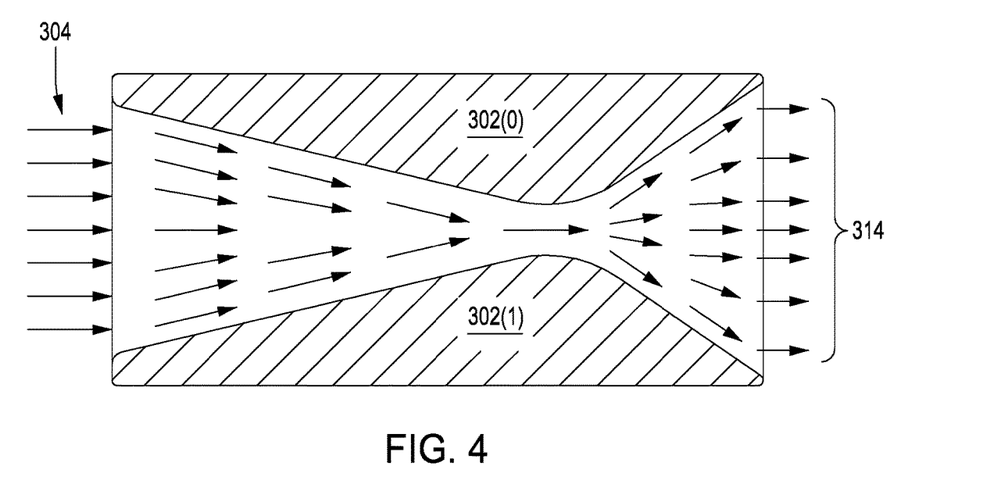
FIG. 4 is an exemplary illustration of a solution estimate generated based on the geometry and boundary conditions of FIG. 4, according to various embodiments of the present invention.

FEA solver 220 provides converged solution 222 to display engine 230. Display engine 230 then causes display device 250 to display converged solution 222 to the end-user. FIGS. 3-4 set forth an example of how mapping engine 210 generates a solution estimate 214 for a fluid dynamics problem.

Mapping Simulation Parameters to a Solution Estimate

FIG. 3 is an exemplary illustration of geometry and boundary conditions associated with a simulation, according to various embodiments of the present invention. As shown, simulation parameters 300 include geometry 302 and boundary conditions 304. In this example, simulation parameters 300 describe a choked-flow fluid dynamics simulation. Geometry 302(0) and 302(1) represent opposing sides of a nozzle configured to produce a choke point. Boundary conditions 304 include a velocity vector field at the inlet to the nozzle.

Mapping engine 210 is configured to receive solution parameters 300 and to then analyze geometry 302 and boundary conditions 304. In doing so, CNN 212 maps simulation parameters 300 to an estimated velocity vector field within the nozzle, through the choke point, to the outlet, as shown in FIG. 4.

Figure 5:
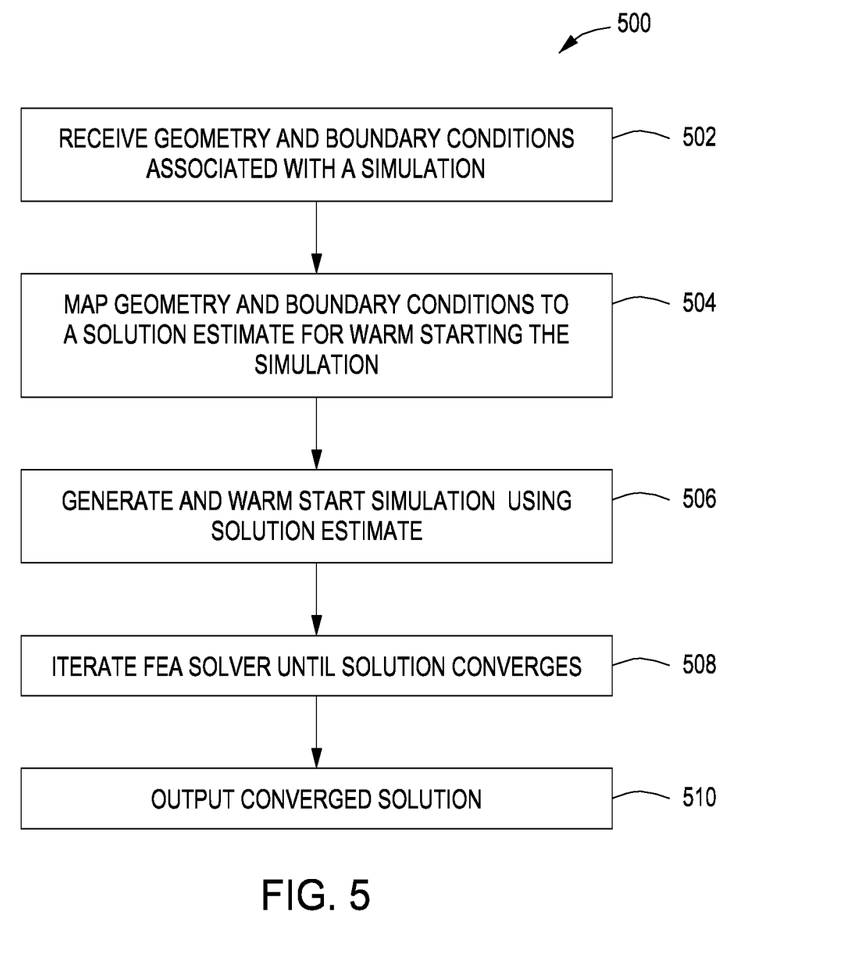
FIG. 5 is a flow diagram of method steps for generating a solution estimate for initializing an FEA solver, according to various embodiments of the present invention.

FIG. 4 is an exemplary illustration of a solution estimate generated based on the geometry and boundary conditions of FIG. 4, according to various embodiments of the present invention. As shown, solution estimate 314 is a velocity vector field depicting the flow velocity at different locations within the nozzle and at the outlet. In this example, mapping engine 210 performs a field-to-field mapping between the inlet flow field associated with boundary conditions 304 and the outlet flow field associated with solution estimate 314, based on geometry 302. Solution estimate 314 may not be entirely accurate and may not consistently follow all physical laws associated with the simulation. However, solution estimate 314 is sufficiently close to a final, converged solution that FEA solver 220 may iterate a reduced number of times to reach convergence. FIG. 5 describes the approach discussed thus far in stepwise fashion.

Procedure for Generating Potential Design Solutions

FIG. 5 is a flow diagram of method steps for generating a solution estimate for initializing an FEA solver, according to various embodiments of the present invention. Although the method steps are described in conjunction with the systems of FIGS. 1-4, persons skilled in the art will understand that any system configured to perform the method steps, in any order, is within the scope of the present invention.

At step 502, mapping engine 210 within simulation application 120 receives geometry and boundary conditions associated with a simulation from an end-user. The received geometry represents a structure or combination of structures within which one or more physical processes may occur. For example, the geometry could represent a wing having a specific cross-section and configured to support a certain amount of weight. The boundary conditions represent constraints applied to the geometry. In the above wing example, the boundary conditions could indicate that the wing is fixed at one end.

At step 504, mapping engine 210 executes CNN 212 to map the geometry and boundary conditions received at step 502 to a solution estimate. The solution estimate includes a set of values that represent an approximate solution for the simulation. The solution estimate may include different types of values depending on the type of simulation to be generated. For example, a materials simulation could include a triangulated mesh representing the internal structure of the material. In this case, the solution estimate would include a stress estimate for each node of the triangulated mesh.

At step 506, FEA solver 220 generates and warm starts the simulation using the geometry and boundary conditions received at step 502 and the solution estimate generated at step 504. FEA solver 220 may implement any technically feasible finite-element approach for constructing the simulation. For example, in a fluid dynamics simulation such as that described in conjunction with FIGS. 3-4, FEA solver 220 could process a grid of cells reflective of the geometry received at step 502, where each cell obeys certain physical laws. Additionally, FEA solver 220 initializes the simulation based on the solution estimate generated at step 504. In the above example, FEA solver 220 could assign an initial mass flow rate to each cell.

At step 508, FEA solver 220 iterates until convergence, thereby generating a converged solution. The converged solution includes a set of values that obey all physical laws associated with the simulation within a certain tolerance or error level. At step 510, display engine 230 displays the converged solution to the end-user via display device 250.

Because FEA solver 220 begins iterating from an initial state that reflects predicted effects of the specific geometry and boundary conditions associated with the simulation, FEA solver 220 may converge much faster than a conventional FEA solver. Further, FEA solver 220 may also outperform conventional warm starting techniques that rely on numerical optimizations because these numerical optimizations do not address geometrical aspects of the simulation.

Persons skilled in the art will understand that the techniques described herein may be combined in any technically feasible fashion. For example, simulation application 120 may generate a hybrid simulation that models both thermal and stress/strain distributions within a single structure. Any and all such combinations fall within the scope of the invention.

In sum, a simulation application receives simulation parameters associated with a simulation to be generated. The simulation parameters include geometry associated with the simulation and corresponding boundary conditions. The simulation engine processes the simulation parameters and then, using a neural network, generates a solution estimate. Based on the estimated solution, the simulation engine then executes a finite element analysis solver using the solution estimate as a starting point. The FEA solver iterates until a converged solution is reached. The converged solution is then provided to the end-user.

At least one advantage of the disclosed approach is that the FEA solver converges much faster when provided with a solution estimate than when starting with no estimate. In addition, because the neural network analyzes problem-specific geometry and boundary conditions, the solution estimate reflects predicted effects of those problem-specific aspects of the simulation. This approach represents a significant improvement over conventional warm starting techniques that only implement numerical optimizations that are agnostic to the specifics of the simulation parameters.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating a finite element analysis (FEA) simulation, the method comprising:
  generating a solution estimate based on (i) a set of simulation parameters that describe physical properties of a simulation and (ii) a first set of training data associated with the set of simulation parameters, wherein the solution estimate comprises a first approximate solution for the simulation;
  warm-starting a finite element analysis (FEA) solver with the solution estimate and the set of simulation parameters to generate an initial solution for a set of governing equations associated with the simulation, wherein the initial solution comprises a second approximate solution for the simulation; and starting from the initial solution, causing the FEA solver to iteratively solve the set of governing equations to generate a converged solution for the simulation, wherein the converged solution comprises a third approximate solution for the simulation.

2. The computer-implemented method of claim 1, wherein the converged solution for the simulation satisfies the set of governing equations within an error tolerance.

3. The computer-implemented method of claim 1, wherein the set of simulation parameters includes:
   geometry that describes a physical structure; and
   one or more boundary conditions applied to the physical structure.

4. The computer-implemented method of claim 3, wherein the simulation predicts dynamics associated with the physical structure.

5. The computer-implemented method of claim 1, wherein warm-starting the FEA solver comprises initializing a finite element mesh associated with the simulation with a set of values included in the solution estimate.

6. The computer-implemented method of claim 1, wherein a convolutional neural network generates the solution estimate based on the set of simulation parameters and the first set of training data.

7. The computer-implemented method of claim 6, wherein the convolutional neural network is trained by adjusting one or more sets of weights associated with the convolutional neural network based on the first set of training data.

8. The computer-implemented method of claim 7, wherein the first set of training data includes:
   a first plurality of sets of simulation parameters associated with a first plurality of simulations; and
   a first plurality of converged solutions generated for the first plurality of simulations.

9. The computer-implemented method of claim 1, wherein the simulation comprises a fluid dynamics simulation, the simulation parameters comprise geometry through which a fluid flows and an inlet velocity field associated with the fluid, and the solution estimate comprises an outlet velocity field associated with the fluid.

10. One or more non-transitory computer-readable media that, when executed by one or more processors, causes the one or more processors to generate a finite element analysis (FEA) simulation, by performing the steps of:
   generating a solution estimate based on (i) a set of simulation parameters that describe physical properties of a simulation and (ii) a first set of training data associated with the set of simulation parameters, wherein the solution estimate comprises a first approximate solution for the simulation;
   warm-starting a finite element analysis (FEA) solver with the solution estimate and the set of simulation parameters to generate an initial solution for a set of governing equations associated with the simulation, wherein the initial solution comprises a second approximate solution for the simulation; and
   starting from the initial solution, causing the FEA solver to iteratively solve the set of governing equations to generate a converged solution for the simulation, wherein the converged solution comprises a third approximate solution for the simulation.

11. The one or more non-transitory computer-readable media of claim 10, wherein the converged solution for the simulation satisfies the set of governing equations within an error tolerance.

12. The one or more non-transitory computer-readable media of claim 10, wherein the set of governing equations correspond to one or more physical laws.

13. The one or more non-transitory computer-readable media of claim 10, wherein the set of simulation parameters includes:
   geometry that describes a physical structure; and
   one or more boundary conditions applied to at least a portion of the physical structure.

14. The one or more non-transitory computer-readable media of claim 10, wherein warm-starting the FEA solver comprises initializing each element of a finite element mesh associated with the simulation with a different value included in the solution estimate.

15. The one or more non-transitory computer-readable media of claim 10, wherein:
   a convolutional neural network generates the solution estimate based on the set of simulation parameters and the first training data; and
   the convolutional neural network includes at least one layer for each dimension of the simulation.

16. The one or more non-transitory computer-readable media of claim 15, wherein the convolutional neural network is trained by adjusting one or more sets of weights associated with the convolutional neural network based on the first set of training data.

17. The one or more non-transitory computer-readable media of claim 16, wherein the first set of training data includes:
   a first plurality of sets of simulation parameters associated with a first plurality of simulations; and
   a first plurality of converged solutions generated for the first plurality of simulations.

18. The one or more non-transitory computer-readable media of claim 10, wherein the simulation comprises a structural simulation, the simulation parameters comprise geometry associated with a structure, and the solution estimate comprises a set of stress values associated with the structure.

19. A system for generating a finite element analysis (FEA) simulation, comprising:
   a memory storing a simulation application; and
   a processor that, when executing the simulation application, is configured to:
      generate a solution estimate based on (i) a set of simulation parameters that describe physical properties of a simulation and (ii) a first set of training data associated with the set of simulation parameters, wherein the solution estimate comprises a first approximate solution for the simulation;
      warm-start a finite element analysis (FEA) solver with the solution estimate and the set of simulation parameters to generate an initial solution for a set of governing equations associated with the simulation, wherein the initial solution comprises a second approximate solution for the simulation; and
      start from the initial solution, causing the FEA solver to iteratively solve the set of governing equations to generate a converged solution for the simulation, wherein the converged solution comprises a third approximate solution for the simulation.

20. The system of claim 19, wherein:
the converged solution for the simulation satisfies the set of governing equations within an error tolerance, and
the set of simulation parameters includes:
geometry that describes a physical structure, and
one or more boundary conditions applied to the physical structure.

* * * * *